(12) United States Patent
Hsu et al.

(10) Patent No.: US 8,764,988 B2
(45) Date of Patent: Jul. 1, 2014

(54) TREATMENT SYSTEM AND METHOD FOR DEGRADING CHLORINATED DNAPL

(75) Inventors: Hsin-Lan Hsu, Hsinchu (TW);
Chien-Yi Liao, Zhongli (TW);
Sun-Yuan Tzeng, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 594 days.

(21) Appl. No.: 13/108,354

(22) Filed: May 16, 2011

(65) Prior Publication Data

US 2012/0145648 A1    Jun. 14, 2012

(30) Foreign Application Priority Data

Dec. 14, 2010  (TW) ............................... 99143791 A

(51) Int. Cl.
*C02F 1/70*    (2006.01)

(52) U.S. Cl.
USPC ............... 210/747.8; 210/757; 405/128.5; 405/128.75

(58) Field of Classification Search
CPC ........ C02F 1/70; C02F 1/705; C02F 2101/32; C02F 2101/322; C02F 2101/325; C02F 2101/327; C02F 2103/06; C02F 2105/04; B09C 1/002; B09C 1/08
USPC .............. 210/747.7, 747.8, 749, 757, 170.07, 210/501, 506; 502/338; 405/128.5, 128.75; 252/178, 181; 516/22
See application file for complete search history.

(56) References Cited

U.S. PATENT DOCUMENTS

| | | | |
|---|---|---|---|
| 3,986,953 A | 10/1976 | Beaucaire | |
| 4,425,261 A | 1/1984 | Stenius et al. | |
| 5,278,106 A | 1/1994 | Nakashima et al. | |
| 5,759,389 A | 6/1998 | Fernando et al. | |
| 5,975,798 A | 11/1999 | Liskowitz et al. | |
| 6,121,371 A | 9/2000 | Matyjaszewski et al. | |
| 6,190,092 B1 | 2/2001 | Miller | |
| 6,734,144 B2 | 5/2004 | Varadaraj et al. | |
| 7,037,946 B1 | 5/2006 | Reinhart et al. | |
| 7,635,236 B2 | 12/2009 | Zhao et al. | |
| 7,641,971 B2 | 1/2010 | Papagianakis | |
| 2002/0151602 A1 | 10/2002 | Vance et al. | |
| 2004/0069720 A1* | 4/2004 | Clausen et al. ............... | 210/749 |
| 2004/0133059 A1 | 7/2004 | Scalzi et al. | |

FOREIGN PATENT DOCUMENTS

| | | |
|---|---|---|
| CN | 10411780 | 8/2008 |
| CN | 100411780 | 8/2008 |
| CN | 101514036 A | 8/2009 |

OTHER PUBLICATIONS

Zhu, et al.; "Catalytic Reduction of Chlorobenzenes with Pd/Fe Nanoparticles: Reactive Sites, Catalyst Stability, Particle Aging, and Regeneration;" Environmental Science and Technology; 2007; pp. 7523-7529.

(Continued)

*Primary Examiner* — Lucas Stelling
(74) *Attorney, Agent, or Firm* — McClure, Qualey & Rodack, LLP

(57) ABSTRACT

A treatment system for degrading chlorinated dense non-aqueous phase liquids (DNAPLs) is disclosed. The treatment system comprises a solvent system and hydrophobic zero valent irons distributed in the solvent system. In addition, the method of remediation of groundwater is also disclosed by using the treatment system.

18 Claims, 6 Drawing Sheets

(56) References Cited

OTHER PUBLICATIONS

Zhu, et al.; Supporting Information for "Catalytic Reduction of Chlorobenzenes with Pd/Fe Nanoparticles: Reactive Sites, Catalyst Stability, Particle Aging, and Regeneration;" pp. 1-16, no date given.
English Abstract translation of CN101514036 (Published Aug. 26, 2009).
CN Office Action dated May 15, 2013.
TW Office Action dated Aug. 8, 2013.
John C. Fountain, Ph.D.: "Technologies for Dense Nonaqueous Phase Liquid Source Zone Remediation"; Technology Evaluation Report; State University of New York at Buffalo—Department of Geology; Dec. 1998.
Xiaosong Chen: "Innovative Remediation Techniques for Treaments of Toxaphene Contamination"; A Dissertation Presented to the Graduate School of the University of Florida in Partial Fulfillment of the Requirements for the Degree of Doctor of Philosophy; 2005.
Song, et al.: "Synthesis of Nano-Sized Iron for Reductive Dechlorination"; vol. 10—Environmental Engineering Research; No. 4, 2005; pp. 175-180.
English language translation of abstract of CN 10411780 (published Aug. 20, 2008).
Phenrat, T., et al.; "Adsorbed Polyelectrolyte Coatings Decrease Fe0 Nanoparticle Reactivity with TCE in Water: Conceptual Model and Mechanisms;" Environmental Science and Technology; vol. 43; No. 5, 2009; pp. 1507-1514.
Phenrat, T., et al.; Supporting Information for "Adsorbed Polyelectrolyte Coatings Decrease Fe0 Nanoparticle Reactivity with TCE in Water: Conceptual Model and Mechanisms;" pp. 1-13, no date given.
Xiao, S., et al.; "Polyelectrolyte Multilayer-Assisted Immobilization of Zero-Valent Iron Nanoparticles onto Polymer Nanofibers for Potential Environmental Applications;" Applied Materials and Interfaces; vol. 1; No. 12; 2009; 2848-2855.
Xiao, S., et al.; Supporting Information for "Polyelectrolyte Multilayer-Assisted Immobilization of Zero-Valent Iron Nanoparticles onto Polymer Nanofibers for Potential Environmental Applications;" pp. 1-4, no date given.
Sirk, K.M., et al.; "Effect of Adsorbed Polyelectrolytes on Nanoscale Zero Valent Iron Particle Attachment to Soil Surface Models;" Environmental Science and Technology; vol. 43; No. 10; 2009; pp. 3803-3808.
Sirk, K.M., et al.; Supporting Information for "Effect of Adsorbed Polyelectrolytes on Nanoscale Zero Valent Iron Particle Attachment to Soil Surface Models;" pp. S1-S7, no date given.
Wang, W., et al.; "Reactivity Characteristics of Poly(Methyl Methacrylate) Coated Nanoscale Iron Particles for Trichloroethylene Remediation:" Journal of Hazardous Materials; 2010; pp. 724-730.
Reinsch, B.C., et al.; "Chemical Transformations During Aging of Zero-Valent Iron Nanoparticles in the Presence of Common Groundwater Dissolved Constituents;" Environmental Science and Technology; vol. 44; No. 9; 2010; pp. 3455-3461.
Reinsch, B.C., et al.; Supporting Information for "Chemical Transformations During Aging of Zero-Valent Iron Nanoparticles in the Presence of Common Groundwater Dissolved Constituents;" pp. S1-S11, no date given.
Li, X.Q., et al.; "Zero-Valent Iron Nanoparticles for Abatement of Environmental Pollutants: Materials and Engineering Aspects;" Critical Reviews in Solid State and Materials Sciences; Jul. 2008; pp. 110-122.
Duan, H., et al.; "Directing Self-Assembly of Nanoparticles at Water/Oil Interfaces;" 2004; pp. 5639-5642.
Shimomura, T., et al.; "Reductive Dechlorination of Tetrachloroethene in a Sand Reactor Using a Potentiostat;" Jul. 5, 2005; pp. 1435-1438.
Saleh, N., et al.; "Adsorbed Triblock Copolymers Deliver Reactive Iron Nanoparticles to the Oil/Water Interface;" Nano Letters; vol. 5; No. 12; 2005; pp. 2489-2494.
Saleh, N., et al.; Supporting Information for "Adsorbed Triblock Copolymers Deliver Reactive Iron Nanoparticles to the Oil/Water Interface;" pp. 1-S2, no date given.
Liu, C.C., et al.; "Effects of Ferrous Ions on the Reductive Dechlorination of Trichloroethylene by Zero-Valent Iron;" Journal of Hazardous Materials B136; 2006; pp. 706-713.
Guo, Z., et al.; "Synthesis of Poly(Methyl Methacrylate) Stabilized Colloidal Zero-Valence Metallic Nanoparticles;" Journal of Materials Chemistry; 2006; pp. 1772-1777.
Matheson, L.J., et al.; "Reductuve Dehalogenation of Chlorinated Methanes by Iron Metal;" Environmental Science and Technology; vol. 28; No. 12; 1994; pp. 2045-2053.
Lowe, A.B., et al.; "Facile Preparation of Transition Metal Nanoparticles Stabilized by Well-Defined (Co) Polymers Synthesized via Aqueous Reversible Addition-Fragmentation Chain Transfer Polymerization;" Journal of American Chemical Society; 2002; pp. 11562-11563.
Lowe, A.B., et al.; Supporting Information for "Facile Preparation of Transition Metal Nanoparticles Stabilized by Well-Defined (Co) Polymers Synthesized via Aqueous Reversible Addition-Fragmentation Chain Transfer Polymerization;" pp. 1-3, no date given.
Phenrat, T., et al.; "Aggregation and Sedimentation of Aqueous Nanoscale Zerovalent Iron Dispersions;" Environmental Science and Technology; vol. 41; No. 1; 2007; pp. 284-290.
Phenrat, T., et al.; Supporting Information for "Aggregation and Sedimentation of Aqueous Nanoscale Zerovalent Iron Dispersions;" pp. 1-14, no date given.
Liu, Y., et al.; "Effect of TCE Concentration and Dissolved Groundwater Solutes and NZVI-Promoted TCE Dechlorination and H2 Evolution;" Environmental Science and Technology; vol. 41; No. 22; 2007; pp. 7881-7887.
Henderson, A.D., et al.; "Long-Term Performance of Zero-Valent Iron Permeable Reactive Barriers: A Critical Review;" Environmental Engineering Science; vol. 24; No. 4; 2007; pp. 401-423.
Saleh, N., et al.; "Surface Modifications Enhance Nanoiron Transport and NAPL Targeting in Saturated Porous Media;" Environmental Engineering Science; vol. 24; No. 1; 2007; pp. 45-58.
He, F., et al.; "Preparation and Characterization of a New Class of Starch-Stabilized Bimetallic Nanoparticles for Degradation of Chlorinated Hydrocarbons in Water;" Environmental Science and Technology; vol. 39; No. 9; 2005; pp. 3314-3320.
Sun, Y.P., et al.; "A Method for the Preparation of Stable Dispersion of Zero-Valent Iron Nanoparticles;" Colloids and Surfaces A: Physiochemical Engineering Aspects 308; 2007; pp. 60-66.
He, F., et al.; "Manipulating the Size and Dispersibility of Zerovalent Iron Nanoparticles by Use of Carboxymethyl Cellulose Stabilizers;" Environmental Science and Technology; vol. 41; No. 17; 2007; pp. 6216-6221.
Lien, H.L., et al.; "Nanoscale Pd/Fe Bimetallic Particles: Catalytic Effects of Palladium on Hydrodechlorination;" Applied Catalysts B: Environmental; 2007; pp. 110-116.
Zhu, B.W., et al.; "Catalytic Reduction of Chlorobenzenes with Pd/Fe Nanoparticles: Reactive Sites, Catalyst Stability, Particle Aging, and Regeneration;" Environmental Science and Technology; vol. 41; No. 21; 2007; pp. 7523-7529.
Lee, C.C., et al.; "Dechlorination of Tetrachloroethylene in Aqueous Solutions Using Metal-Modified Zerovalent Silicon;" Environmental Science and Technology; vol. 42; No. 13; 2008; pp. 4752-4757.
Tiraferri, A., et al.; "Reduced Aggregation and Sedimentation of Zero-Valent Iron Nanoparticles in the Presence of Guar Gum;" Journal of Colloid and Interface Science 324; 2008; pp. 71-79.
Song, H., et al.; "Catalytic Hydrodechlorination of Chlorinated Ethenes by Nanoscale Zero-Valent Iron;" Applied Catalysts B: Environmental; 2008; pp. 53-60.
Jeng, J.Y., et al.; "Dispersion of Oleate-Modified CuO Nanoparticles in a Nonpolar Solvent;" Journal of American Ceramic Society; 2007; pp. 3676-3679.
Gao, X., et al.; "Synthesis and Characterization of Thiol-Capped FePt Nanomagnetic Porous Particles;" 2005; pp. 949-952.
Sh Eng, Y., et al.; "Influence of Octadecyl Dihydrogen Phosphate on the Formation of Active Super-Fine Calcium Carbonate;" Journal of Colloid and Interface Science 272; 2004; pp. 326-329.

\* cited by examiner

TREATMENT SYSTEM AND METHOD FOR DEGRADING CHLORINATED DNAPL

This application claims the benefit of Taiwan application Serial No. 099143791, filed Dec. 14, 2010, the subject matter of which is incorporated herein by reference.

BACKGROUND

1. Technical Field

The disclosure relates in general to a treatment system and a method, and more particularly to a groundwater treatment system and a method for degrading chlorinated dense non-aqueous phase liquids (DNAPLs) effectively.

2. Description of the Related Art

Halogenated hydrocarbons are commonly found in the environment because they are widely used as an effective, yet relatively nonflammable, solvent, unlike kerosene or gasoline. Halogenated hydrocarbon solvents such as trichloroethene (or trichloroethylene, TCE) and tetrachloroethene (or perchloroethylene, PCE), which have higher densities than water, are referred to as dense non-aqueous phase liquids (DNAPLs). Groundwater contamination by DNAPLs, like TCE and PCE, were identified as a serious problem beginning in the 1970s. However, some groundwater contaminated sites are either technically impracticable, or the concentrations of the chlorinated organic contaminants are still higher than the regulated maximum contaminant levels even after decades of remediation.

Small amounts of DNAPLs can serve as a long term contamination source because their water solubility is low and they are toxic at very low concentrations. Superfund sites with TCE and PCE groundwater contamination include: electronic manufacturing plants, military facilities, drycleaners and old landfills. In most cases groundwater pollution resulted from storage or disposal of liquid solvent wastes between 1940 and 1970. Often TCE and PCE are found in water with other toxic chemicals such as dichloroethenes (DCE) and vinyl chloride (VC) that are produced by natural degradation of these two chemicals. TCE is considered an animal carcinogen and a health hazard to humans. The International Agency for Research on Cancer has determined that trichloroethylene is "probably carcinogenic to humans". People exposed to TCE by contaminated drinking water exhibit health problems including skin irritations, cancers, birth defects, miscarriages, and coordination, speech and hearing impairment.

Many development and implementation of groundwater contamination remediation treatments have been provided. The treatment methods for DNAPL contaminated groundwater generally can be classified into passive methods and active methods. Passive methods, such as permeable reactive barriers (PRB) or hydraulic isolation, assure clean water on the down gradient side. However, as long as the DNAPL is not removed or depleted in the groundwater, the treatment operation has to keep running, which often takes decades or even longer. Since the long-run maintenance and management poses uncertainties to the quality of the treatment, actively removal of the DNAPLs often is desired.

The common active treatment methods usually involve injection of treatment chemicals, such as persulfate and permanganate. These chemicals are usually very effective in degrading the dissolved contaminants. However, the depletion of DNAPLs is limited by the slow dissolution process. Therefore, these chemicals are not effective in depleting the DNAPLs.

Nowadays, more focuses are placed on developing treatment chemicals targeted at DNAPLs. The emulsified zero-valent irons, known as EZVI, formulated by the National Aeronautics and Space Administration (NASA) is one example. The zero-valent irons have been well known as an environment-friendly treatment agent, capable of reductive dechlorination and thus detoxication for the chlorinated hydrocarbons, little chlorinated byproducts, and fast reaction rate and inexpensive. Based on a well designed recipe, zero-valent irons, vegetable oil and water are emulsified by the surfactants to form the EZVI, whose continuous phase is water. According to NASA, the oil membrane increases the chance of zero-valent irons remained on DNAPLs, and also serves as the carbon sources for microorganisms; thereby treating DNAPLs by bioremediation after chemical treatment. EZVI has been applied in a pilot-scale remediation. It was observed that the emulsion system was not sustained shortly after injection into the groundwater, leaving the irons trapped in soil and the oil floating at the water table.

The other targeted treatment chemical is proposed by Prof. Lowry's research group of Carnegie Mellon University, who use copolymers as the dispersants for nanoscale zero-valent irons in water. The copolymers consist of two hydrophilic polymers and a hydrophobic one. It was found that the hydrophobic polymer helps the zero-valent irons being retained at the DNAPLs/water interface. Despite of the improvement, the degradation reaction is still limited to the DNAPLs/water interface.

SUMMARY

The disclosure relates to the treatment system and the method for degrading chlorinated dense non-aqueous phase liquids (DNAPLs).

According to an embodiment of the disclosure, a treatment system comprises a solvent system and hydrophobic zero valent irons distributed in the solvent system. The solvent system comprises a solvent, a cosolvent and water, and the volume ratio of the cosolvent to the solvent is about 0.5~16. The solvent system comprises about 10~30 vol % of water. The hydrophobic zero valent irons distributed in the solvent system is in a concentration of about 0.01 g/mL~0.2 g/mL.

According to another embodiment of the disclosure, a treatment system comprises a solvent system and hydrophobic zero valent irons distributed in the solvent system. The solvent system comprises about 76~95 vol % of butanol and about 5~24 vol % or 10~24 vol % or 15~24 vol % of water. The hydrophobic zero valent irons distributed in the solvent system is in a concentration of about 0.01 g/mL~0.2 g/mL.

According to yet another embodiment of the disclosure, a method for degrading chlorinated dense non-aqueous phase liquids (DNAPLs), comprises: providing a treatment system, wherein the treatment system comprises a solvent system and hydrophobic zero valent irons, the solvent system at least comprises a solvent, a cosolvent and about 10~30 vol % of water, a volume ratio of the cosolvent to the solvent is about 0.5~16, and the hydrophobic zero valent irons are distributed in the solvent system in a concentration of about 0.01 g/mL~0.2 g/mL; and adding the treatment system into at least one polluted hot spot so as to degrade chlorinated DNAPLs.

The disclosure will become apparent from the following detailed description of the non-limiting embodiments. The following description is made with reference to the accompanying drawings.

DETAILED DESCRIPTION

Figure 1:
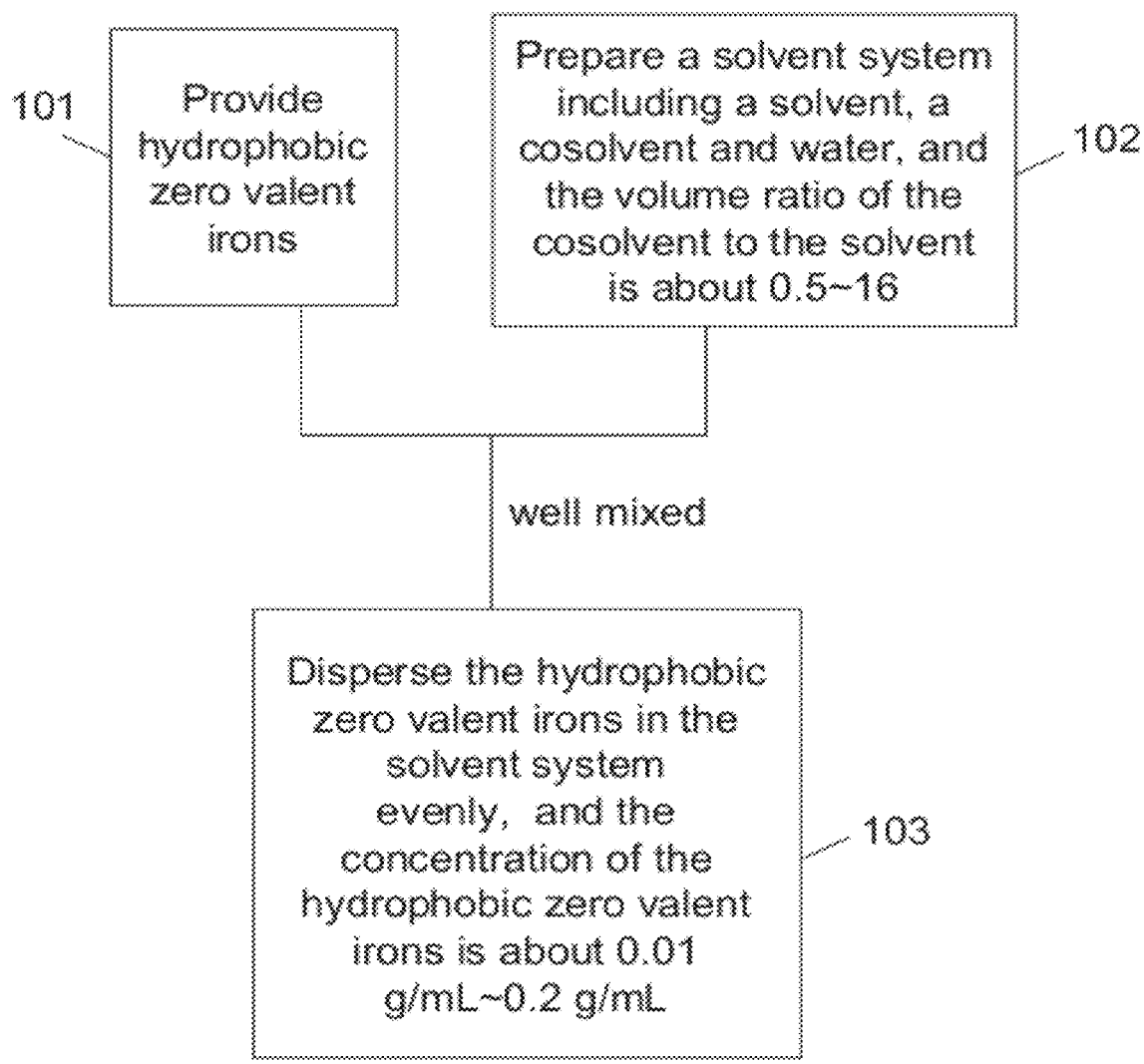
FIG. 1 is a process flow of method for preparing a treatment system according to the embodiment of the disclosure.

The embodiments of the disclosure disclose a treatment system for degrading chlorinated dense non-aqueous phase liquids (DNAPLs) directly. In the embodiment, the reactants are contained within the organic solvent and transported into the chlorinated DNAPLs due to the high solubility of the organic solvent in DNAPLs, thereby degrading chlorinated DNAPLs directly.

<Treatment System>

In an embodiment, a treatment system comprises a solvent system and hydrophobic zero valent irons distributed in the solvent system. The solvent system comprises a solvent, a cosolvent and water, and the volume ratio of the cosolvent to the solvent is about 0.5~16. The solvent system comprises about 10~30 vol % of water. The hydrophobic zero valent irons distributed in the solvent system is in a concentration of about 0.01 g/mL~0.2 g/mL.

Examples of the solvent include C4-C10 esters, C12-C15 aromatic hydrocarbon esters, C5-C8 alcohols, or a combination thereof. Examples of the cosolvent include C1-C3 alcohols, acetone, or a combination thereof.

In an embodiment, when the treatment system comprises about 10~15 vol % of water and the volume ratio of the cosolvent to the solvent is about 3~16, the solvent is selected from the group consisting of C12-C15 benzoic esters and mixtures thereof, and the cosolvent is acetone.

In another embodiment, when the treatment system comprises about 10~30 vol % of water and the volume ratio of the cosolvent to the solvent is about 0.5~4, the solvent is selected from the group consisting of C4-C10 esters, C5-C8 alcohols and a combination thereof, and the cosolvent is selected from the group consisting of C1-C3 alcohols, acetone and a combination thereof.

In the embodiment, examples of the C4-C10 esters include amyl formate, ethyl acetate, propyl acetate, butyl acetate, pentyl acetate, hexyl acetate, heptyl acetate, octyl acetate, ethyl propanoate, propyl propionate, butyl propanoate, pentyl propanoate, hexyl propanoate, ethyl butanoate, propyl butanoate, butyl butanoate, pentyl butanoate, hexyl butanoate, ethyl pentanoate, propyl pentanoate, butyl pentanoate, pentyl pentanoate, ethyl hexanoate, propyl hexanoate, butyl hexanoate, ethyl heptanoate, propyl heptanoate, butyl heptanoate, ethyl octanoate, propyl octanoate, or a combination thereof. Also, examples of the C5-C8 alcohols of the solvent include pentanol, hexanol, heptanol, octanol, benzyl alcohol (/phenylmethanol), phenethyl alcohol (/phenylethanol), or a combination thereof. Also, examples of the C1-C3 alcohols of the cosolvent include methanol, ethanol, isopropanol, or a combination thereof.

Moreover, the hydrophobic zero valent irons distributed in the solvent system could be prepared in the laboratory. For example, nanoscale zero valent irons (containing Pd catalyst or not) are synthesized by chemical reduction, and then subjected to surface modification, thereby obtaining the hydrophobic zero valent irons which have the tendency to retain in the organic solvent. In an embodiment, the hydrophobic zero valent irons have particle sizes less than 1 μm.

The methods for preparing the treatment system of the embodiment are provided below. The preparing steps in details of the embodiment are for demonstration, but not intended for limitation. The modifications and variations can be made without departing from the spirit of the disclosure to meet the requirements of the practical applications.

<Methods for Preparing Treatment System>

FIG. 1 is a process flow of method for preparing a treatment system according to the embodiment of the disclosure. First, the hydrophobic zero valent irons are provided as shown in step 101, and a solvent system is prepared as shown in step 102.

Step of providing the hydrophobic zero valent irons may include the hydrophobic surface modification on the zero valent irons by selecting appropriate modifiers. For example, nanoscale zero valent irons (containing catalyst, such as Pd, or not) are synthesized by chemical reduction, and then subjected to the hydrophobic surface modification, thereby obtaining the hydrophobic zero valent irons. Addition of catalyst increases the reactivity of the zero valent irons (ex: addition amount of Pd catalyst is 0.01~1 weight percent of irons). There are a variety of methods for synthesizing the nanoscale zero valent irons (see, for example, Lien, H.-L., and W.-X. Zhang (2007), "Nanoscale Pd/Fe bimetallic particles: Catalytic effects of palladium on hydrodechlorination," Applied Catalysis B, 77: 110-116; Or Sun, Y.-P., X.-Q. Li, W.-X. Zhang, and H. P. Wang (2007), "A method for the preparation of stable dispersion of zero-valent iron nanoparticles," Colloids and Surfaces A: Physicochemical and Engineering Aspects, 308(1-3): 60-66.), but the disclosure has no particular restriction on which methods should be used.

Also, examples of the modifier for hydrophobic surface modification on nanoscale zero valent irons include acrylate ester, poly acrylate ester, alkyl carboxylate, alkyl thiol, and alkyl phosphate ester. A lot of methods of hydrophobic surface modification have been well known, and the disclosure has no particular restriction on which modification methods should be used. Jeng et al. (Jeng, J.-Y., J.-C. Liu, and J.-H. Jean (2007), "Dispersion of Oleate-Modified CuO Nanoparticles in a Nonpolar Solvent," J. of the American Ceramic Society, 90: 3676-3679.) discloses a hydrophobic surface modification using alkyl carboxylate. Gao et al. (Gao, X., K. Tam, K. Yu, and S. Tsang (2005), "Synthesis and Characterization of Thiol-Capped FePt Nanomagnetic Porous Particles," Small, 1: 949-952) discloses a hydrophobic surface modification using alkyl thiol. Wang et al. (Wang, W., M. Zhou, Z. Jin, and T. Li (2010), "Reactivity Characteristics of Poly(Methyl Methacrylate) Coated Nanoscale Iron Particles for Trichloroethylene Remediation," J of Hazardous Materials, 173: 724-730) discloses a hydrophobic surface modification using acrylate ester.

In step 102, the solvent system comprises a solvent, a cosolvent and water, and the volume ratio of the cosolvent to the solvent is about 0.5~16. The solvent system comprises about 10~30 vol % of water. Examples of the solvent and the cosolvent selected in the embodiment are listed above, and not described redundantly here.

In step 103, a treatment system is obtained by well mixing the hydrophobic zero valent irons and the solvent system, for evenly dispersing the hydrophobic zero valent irons in the solvent system. In an embodiment, the hydrophobic zero valent irons distributed in the solvent system is in a concentration of about 0.01 g/mL~0.2 g/mL.

A treatment system preparation 1 is provided below, for illustrating a method of preparing the treatment system of the embodiment in details. It is understood by people skilled in the art that the preparing steps in details are for demonstration, but not intended for limitation. The modifications and variations can be made without departing from the spirit of the disclosure to meet the requirements of the practical applications.

<Treatment System Preparation 1>

1. Synthesis of Zero Valent Irons 24.8950 g of solid ferrous sulfate ($FeSO_4 \cdot 7H_2O$) and 6.7720 g of solid Sodium borohydride (NaBH4) were respectively dissolved in 500 mL and 10 mL of deoxygenated water, and then well mixed by slowly mechanical agitation for proceeding the synthesis reaction of zero valent irons. Ferrous iron ($Fe^{2+}$) was reduced according to the following equation. When no gas was generated, 0.1065 g of palladium(II) acetate (the concentration of Pd in palladium(II) acetate is 47 wt %) was added into the mixture, and the reaction proceeded for another 10 minutes. Afterwards, zero valent irons were collected from the mixture by a magnet, washed by ethanol a few times and frozen dried. The whole procedures proceeded in a glove box full of nitrogen gas for preventing oxidation of zero valent irons.

$$3H_2O+2Fe^{2+}+BH_4^- \rightarrow 2Fe^0+4H^++H_2BO_3^-$$

2. Hydrophobic Surface Modification of Zero Valent Irons 0.0030 g of mono-N-dodecyl phosphate ester (as a modifier) was added into 100 ml of ethanol, and zero valent irons prepared by the above procedures were added into the solution. The solution was mechanically agitated for about 3 hours, and then filtered. The hydrophobic zero valent irons were washed by ethanol a few times and then stored in isopropanol. Before use, isopropanol was removed by filtration and evaporation.

3. Preparation of Treatment System 9 ml of ethyl acetate (as a solvent), 9 ml of isopropanol (IPA) (as a cosolvent) and 2 ml of water were mixed by a vortexer. 2.29 g of hydrophobic zero valent irons was then added into the mixture, and ultrasonicated for half hour to obtain a treatment system, where the hydrophobic zero valent irons were evenly dispersed in the solvent system.

<Treatment System Preparation 2>

1. Synthesis of Zero Valent Irons 14 g of solid ferrous chloride ($FeCl_2 \cdot 4H_2O$) and 10 g of liquid poly acrylic acid (molecular weight=8,000-12,000) were dissolved in 500 mL of deoxygenated water. 5 g of solid Sodium borohydride (NaBH4) were dissolved in 10 mL of deoxygenated water and then slowly added to the prepared ferrous solution for proceeding the synthesis reaction of zero valent irons. Polyacrylate acid helps to produce smaller iron particles and can be substituted by other kinds of polyelectrolytes such as polyvinyl alcohol-co-vinyl acetate-co-itaconic acid. When no gas was generated, 0.01 g of palladium (II) acetate (the concentration of Pd in palladium(II) acetate is 47 wt %) was added into the mixture, and the reaction proceeded for another 10 minutes. The iron solution was then centrifuged, and the iron particles were collected by removing the aqueous solution followed by 2-3 times of ethanol wash and centrifuge. Except when centrifuged, the whole procedures proceeded in a glove box full of nitrogen gas for preventing oxidation of zero valent irons.

2. Hydrophobic Surface Modification of Zero Valent Irons

300 μL of dodecanethiol (as a modifier) was added into 100 ml of isopropanol, and 2.5 g of zero valent irons prepared by the above procedures were added into the solution. The solution was ultrasonicated for about 2-3 hours, and then stored as it was. Before use, isopropanol was removed by filtration and evaporation.

3. Preparation of Treatment System 12.5 ml of benzyl alcohol (as a solvent), 12.5 ml of isopropanol (IPA) (as a cosolvent) and 6 ml of water were mixed by a vortexer. 2.5 g of hydrophobic zero valent irons was then added into the mixture, and ultrasonicated for half hour to obtain a treatment system, where the hydrophobic zero valent irons were evenly dispersed in the solvent system.

Several experiments have been conducted to investigate the effects of the treatment system on the degradation of chlorinated DNAPLs. Since the purpose is to treat DNAPLs and zero valent irons usually not active in pure organic solvent, the solvent composition is especially crucial in the preparation of treatment system in order to achieve the purpose. Different surface modifications on zero valent irons may affect the dispersivity of irons and the degradation rate, but they are not the deciding factor when it comes to the capability of treating the DNAPL phase. Below experiments are performed using irons coating with dodecyl phosphate ester, but the validity of the solvent composition is independent of the modification of irons. The experimental results are listed below. In those experiments, trichloroethylene (TCE, $C_2HCl_3$) is the chlorinated DNAPL target to be degraded.

<Reactive Solvent Systems and Degradation Results Thereof>

Experiment 1

In Experiment 1, an experiment set and a control set were conducted for investigation. 3 μl of TCE was added into 20 ml of the treatment system prepared in the Treatment System Preparation 1 as the experiment set. 3 μl of TCE was added into 20 ml of the solvent system without hydrophobic zero valent irons as the control set. Table 1 shows the composition of the solvent system of Experiment 1.

TABLE 1

| Component | Vol. % |
| --- | --- |
| Ethyl acetate | 45 |
| IPA | 45 |
| Water | 10 |

Figure 2:
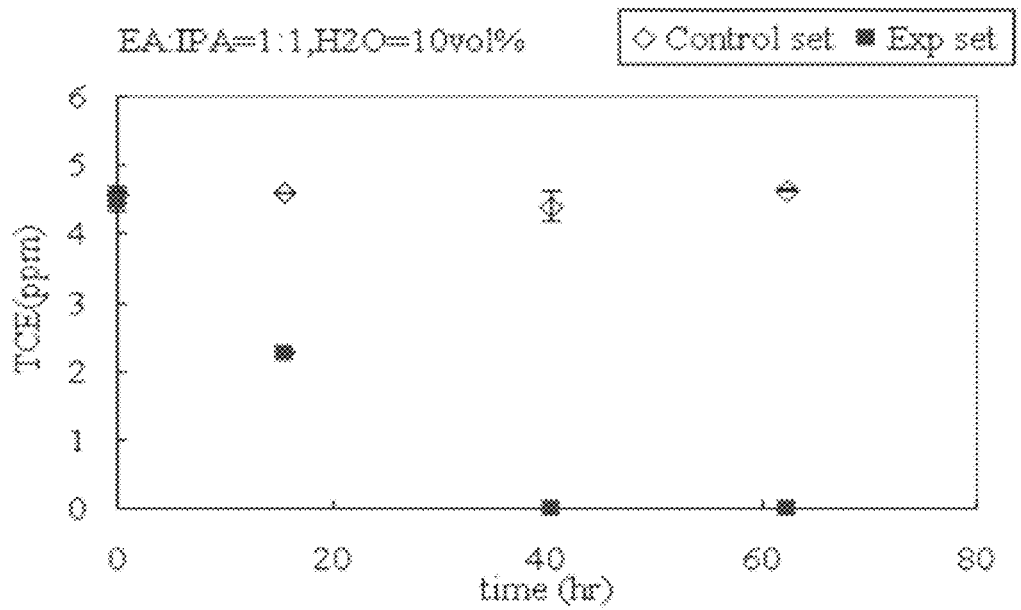
FIG. 2 is the results of the TCE concentration variation with time in Experiment 1.

Both of the experiment and control sets were placed on the vibrator at 40 rpm and were sampled periodically. When sampled, 20 μl of samples were taken using gas tight syringes, and mixed with 980 μl of IPA. Concentrations of TCE were then analyzed using Gas Chromatography-Electron Capture Detectors (GC-ECD). FIG. 2 is the results of the TCE concentration variation with time in Experiment 1. The error bars in FIG. 2 represent the standard deviation of the measurements. As shown in FIG. 2, TCE concentrations of the control set were found to remain relatively stable, which means good air tight condition of the reaction system. TCE concentrations of the experiment set were found to reduce with time. About 50% of TCE reduction was observed within 20 hours. Therefore, the results presented in FIG. 2 have proved that the oil-phase treatment system in Experiment 1 is capable of degrading TCE effectively.

Experiment 2

In Experiment 2, the treatment system is similar to that in Experiment 1, except the component ratio of the solvent system is adjusted according to Table 2. An experiment set and a control set are conducted for investigation and prepared following the same procedures as those of Experiment 1.

TABLE 2

| Component | Vol. % |
| --- | --- |
| Ethyl acetate | 35 |
| IPA | 35 |
| Water | 30 |

Figure 3:
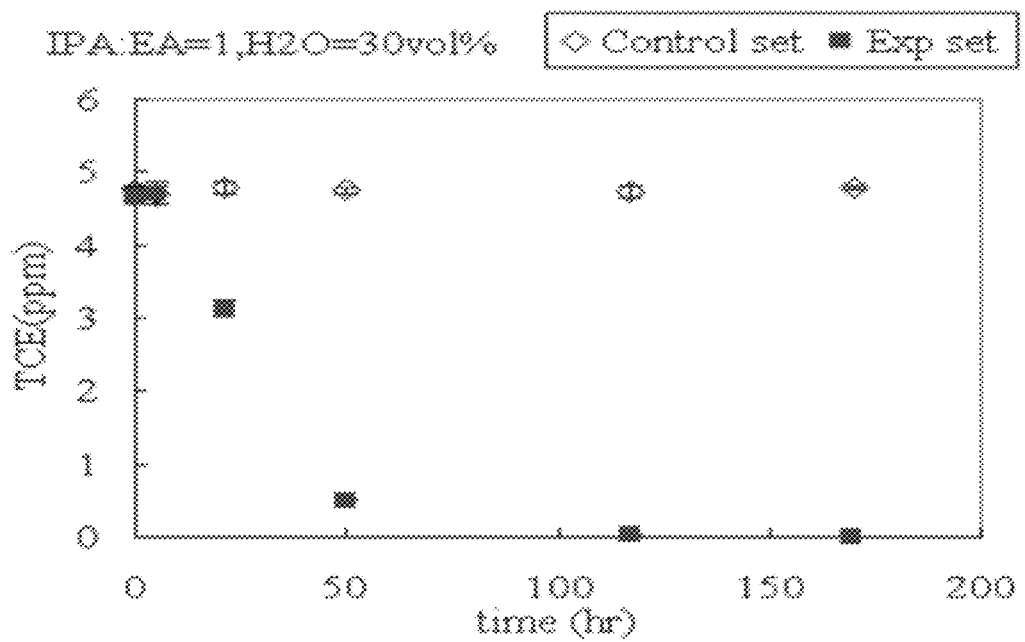
FIG. 3 is the results of the TCE concentration variation with time in Experiment 2.

The mixing, sampling and TCE concentration analysis methods are the same as those in Experiment 1. FIG. 3 is the results of the TCE concentration variation with time in Experiment 2. The error bars in FIG. 3 represent the standard deviation of the measurements. The stable TCE concentrations in the control set indicate good air tight condition of the reaction system. Whereas, TCE concentrations in the experiment set were reduced to 3.12 ppm from initial 4.69 ppm (about 66% of initial TCE concentration were remained) in 20 hours. Therefore, the results presented in FIG. 3 have proved that the oil-phase treatment system in Experiment 2 is capable of degrading TCE effectively.

Experiment 3

In Experiment 3, the treatment system differs from that of Experiment 1 in the solvent composition and ratios. Table 3 shows the composition of the solvent system of Experiment 3. An experiment set and a control set are conducted for investigation and prepared following the same procedures as those of Experiment 1.

TABLE 3

| Component | Vol. % |
| --- | --- |
| Amyl acetate | 50 |
| IPA | 40 |
| Water | 10 |

Figure 4:
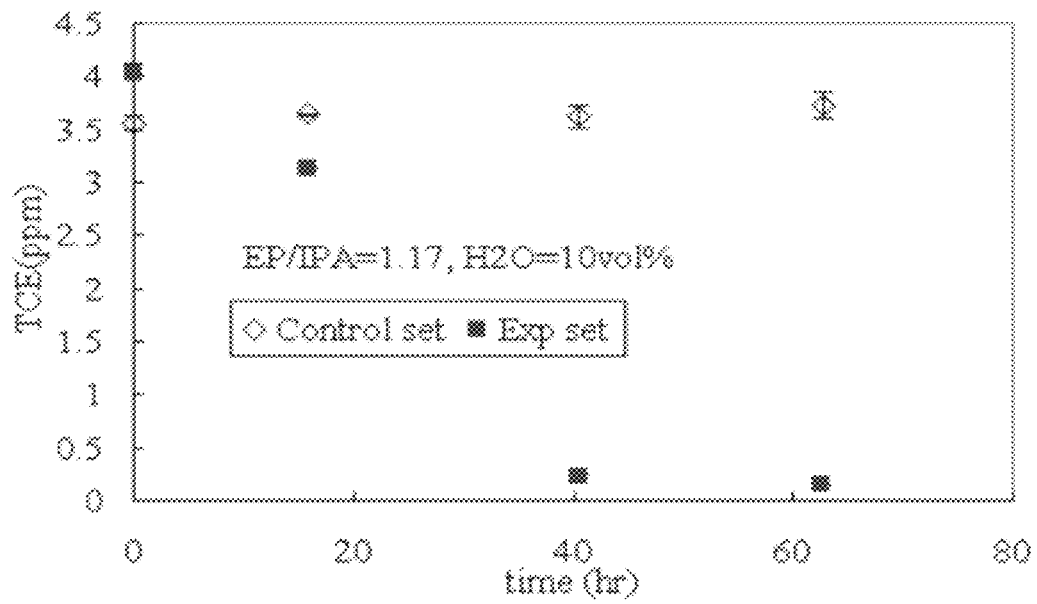
FIG. 4 is the results of the TCE concentration variation with time in Experiment 3.

The mixing, sampling and TCE concentration analysis methods are the same as those in Experiment 1. FIG. 4 is the results of the TCE concentration variation with time in Experiment 3. The error bars in FIG. 4 represent the standard deviation of the measurements. The stable TCE concentrations in the control set indicate good air tight condition of the reaction system. Whereas, TCE concentrations in f the experiment set in Experiment 3 were reduced to 3.1 ppm from 4 ppm (initial concentration) in 15 hours, and continuously reduced to 0.2 ppm in 40 hours. Therefore, the results presented in FIG. 4 have proved that the oil-phase treatment system in Experiment 3 is capable of degrading TCE effectively.

Experiment 4

In Experiment 4, the treatment system differs from that of Experiment 1 in the solvent composition and ratios. Table 4 shows the composition of the solvent system of Experiment 4. An experiment set and a control set are conducted for investigation and prepared following the same procedures as those of Experiment 1.

TABLE 4

| Component | Vol. % |
| --- | --- |
| C12~C15 Alkyl Benzoate, Cetiol AB | 22.5 |
| IPA | 67.5 |
| Water | 10 |

Figure 5:
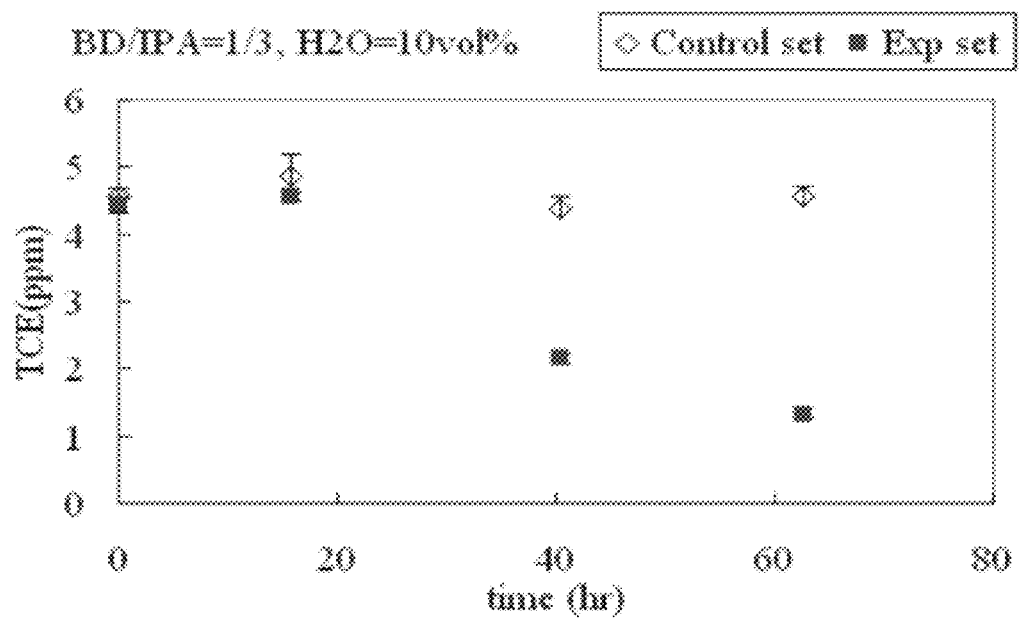
FIG. 5 is the results of the TCE concentration variation with time in Experiment 4.

The mixing, sampling and TCE concentration analysis methods are the same as those in Experiment 1. FIG. 5 is the results of the TCE concentration variation with time in Experiment 4. The error bars in FIG. 5 represent the standard deviation of the measurements. The stable TCE concentrations in the control set indicate good air tight condition of the reaction system. Whereas, TCE concentrations in the experiment set were reduced to 2.15 ppm from 4.45 ppm (initial TCE concentration) (about 50% of initial TCE concentration were remained) in 40 hours. Therefore, the results presented in FIG. 5 have proved that the oil-phase treatment system in Experiment 4 is capable of degrading TCE effectively.

<Non-Reactive Solvent Systems and Experimental Results Thereof>

Experiments 5~7

Figure 6:
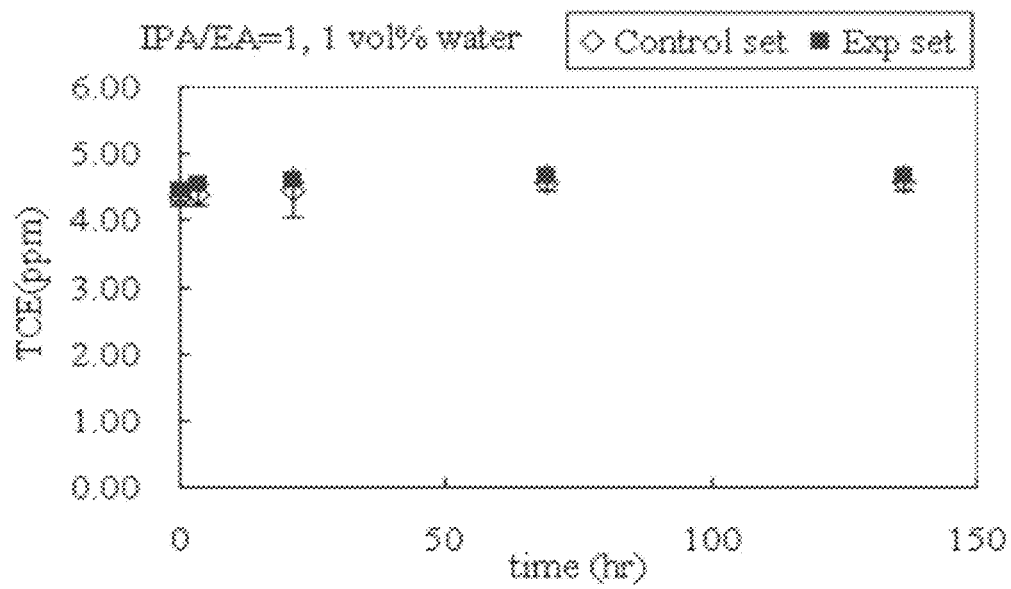
FIG. 6 is the results of the TCE concentration variation with time in Experiment 5.
Figure 7:
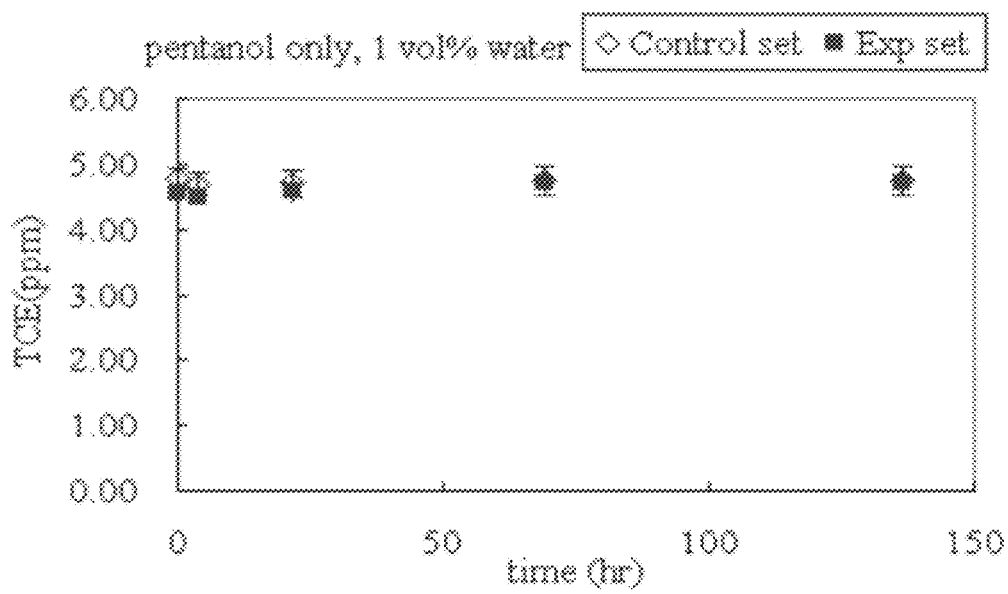
FIG. 7 is the results of the TCE concentration variation with time in Experiment 6.
Figure 8:
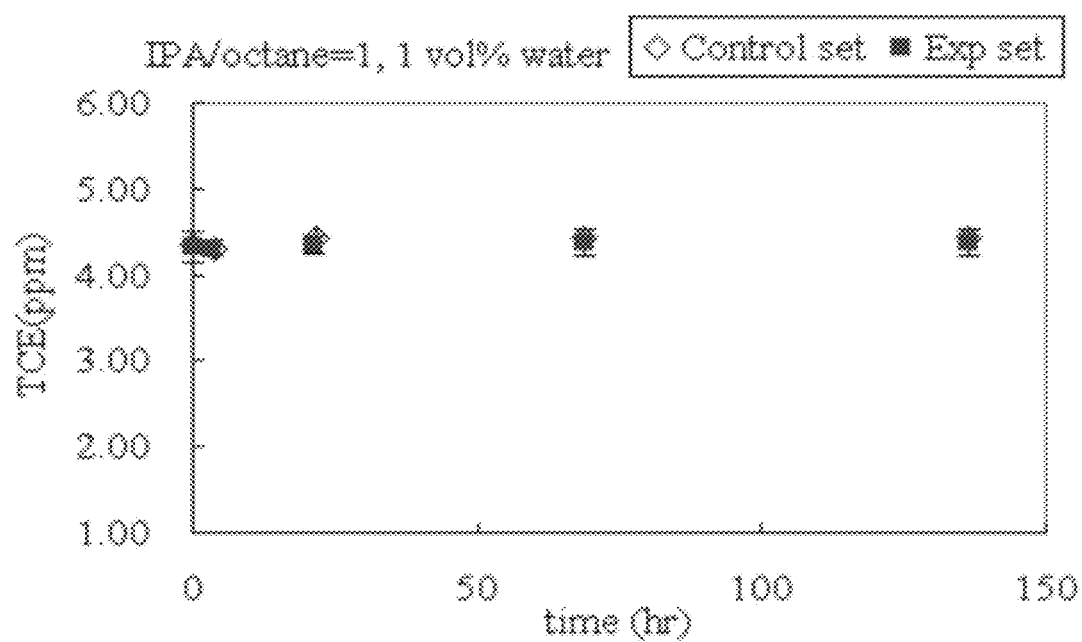
FIG. 8 is the results of the TCE concentration variation with time in Experiment 7.

In Experiments 5~7, the treatment systems are similar to Experiment 1 except that the solvent systems were replaced by those listed in Tables 5~7, respectively. The preparation of the experiment and control sets as well as the follow-up mixing, sampling, and TCE analysis methods are the same as those in Experiment 1. The results are shown in FIG. 6~FIG. 8, and no apparent TCE degradation has been observed, wherein the error bars in FIG. 6~FIG. 8 represent the standard deviation of the measurements. This indicates that zero valent irons in the solvent systems of Experiments 5~7 are not capable of degrading TCE.

TABLE 5

| Component | Vol. % |
| --- | --- |
| Ethyl acetate | 49.5 |
| IPA | 49.5 |
| Water | 1 |

TABLE 6

| Component | Vol. % |
| --- | --- |
| Pentanol | 99 |
| Water | 1 |

TABLE 7

| Component | Vol. % |
| --- | --- |
| Octane | 49.5 |
| IPA | 49.5 |
| Water | 1 |

<Maximum Water Contents of Solvent System>

Figure 9:
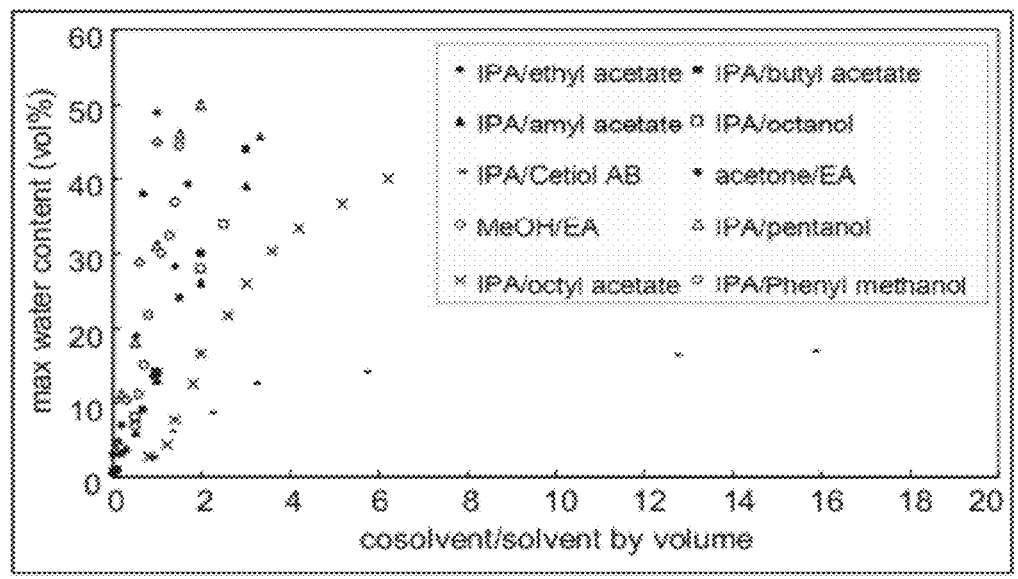
FIG. 9 is the maximum water contents of different solvent systems.

A higher content of water in the solvent system is helpful in achieving a better degradation rate of TCE. However, too much water in the solvent system causes the treatment system to be miscible with water and immiscible with DNAPLs. In order to treat DNAPLs effectively, the treatment system has to be miscible with DNAPLs and thus the water content shall not exceed some upper limit. FIG. 9 is the maximum water contents of different solvent systems. In FIG. 9, x-coordinate represents the ratios of cosolvent to solvent (by volume), and y-coordinate represents the maximum water contents (vol %) at the specific ratios of cosolvent to solvent correspondingly. The right boundary of each curve in FIG. 9 represents the safety margin of water content in each solvent system. Over the safety margin, miscibility with water appears apparently. It should be noted that the data of FIG. 9 were collected at 20~25 and is subject to change at temperatures outside the range.

Besides the treatment systems disclosed above, an alternative treatment system whose solvent system comprising butanol and water is also capable of degrading chlorinated DNAPLs effectively. In another embodiment, a treatment system comprises a solvent system and hydrophobic zero valent irons distributed in the solvent system. The solvent system comprises about 76~95 vol % of butanol and about 5~24 vol % or 10~24 vol % or 15~24 vol % of water. The hydrophobic zero valent irons distributed in the solvent system is in a concentration of about 0.01 g/mL~0.2 g/mL.

Experiment 8

In Experiment 8, procedures are similar to those of Experiment 1 except that the solvent component and the volume ratio of the solvent system are replaced by the recipe listed in Table 8. An experiment set and a control set are also conducted for investigation.

TABLE 8

| Component | Vol. % |
|---|---|
| Butanol | 90 |
| Water | 10 |

Figure 10:
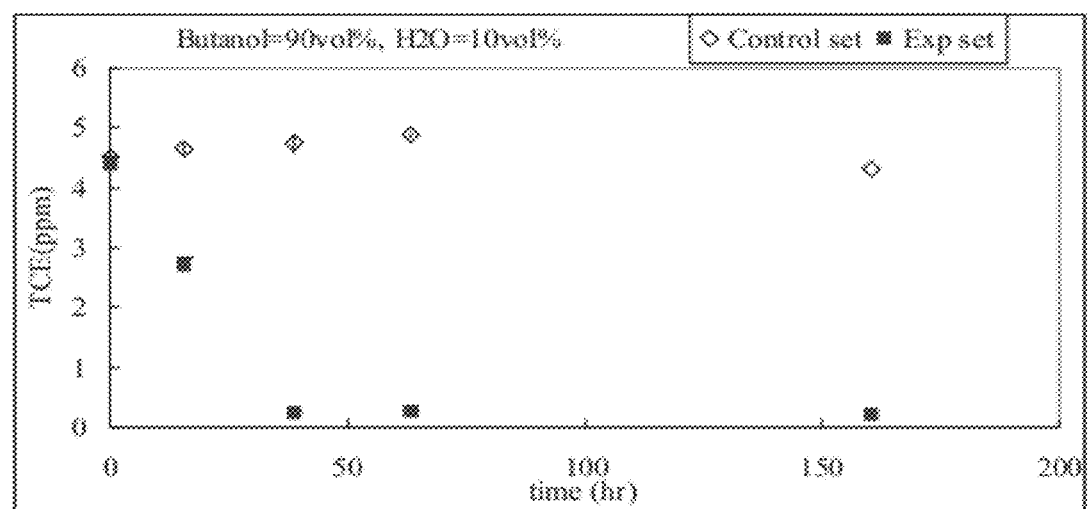
FIG. 10 is the results of the TCE concentration variation with time in Experiment 8.

The mixing, sampling and TCE concentration analysis methods are the same as those in Experiment 1. FIG. 10 is the results of the TCE concentration variation with time in Experiment 8. The error bars in FIG. 10 represent the standard deviation of the measurements. The stable TCE concentrations in the control set indicate good air tight condition of the reaction system. Whereas, TCE concentration in the experiment set was reduced to 2.71 ppm from 4.39 ppm (about 61.8% of initial TCE concentration were remained) in 15 hours, and continuously reduced to 0.25 ppm in 38 hours. Therefore, the results presented in FIG. 10 have proved that the oil-phase treatment system in Experiment 8 is capable of degrading TCE effectively.

<Applications of Treatment System>

The treatment systems of the embodiments have the ability of treating the pollutants such as chlorinated DNAPLs directly. In the practical application, after detailed site characterization is conducted and the spot with high occurrence of chlorinated DNAPL in the groundwater is located, the treatment systems of the embodiments could be injected into a polluted hot spot, where there is a high occurrence potential of DNAPL, to degrade the chlorinated DNAPLs effectively, thereby accomplishing a purpose of degradation of the oil-phase pollutants.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A treatment system, comprising:
a solvent system, at least comprising:
a solvent, selected from the group consisting of C4-C10 esters, C12-C15 aromatic hydrocarbon esters, C5-C8 alcohols, and a combination thereof;
a cosolvent, and a volume ratio of the cosolvent to the solvent about 0.5~16; and
about 10-30 vol% of water; and
hydrophobic zero valent irons, distributed in the solvent system in a concentration of about 0.01 g/mL~0.2 g/mL.

2. The treatment system according to claim 1, wherein the cosolvent is selected from the group consisting of alcohols, acetone, and a combination thereof.

3. A treatment system, comprising:
a solvent system, at least comprising:
a solvent;
a cosolvent, and a volume ratio of the cosolvent to the solvent about 0.5~16; and
about 10~30 vol% of water; and
hydrophobic zero valent irons, distributed in the solvent system in a concentration of about 0.01 g/mL~0.2 g/mL;
wherein the solvent is selected from C12-C15 benzoic esters and mixtures thereof, and the cosolvent is acetone.

4. The treatment system according to claim 3, wherein the treatment system comprises about 10~15 vol% of water and the volume ratio of the cosolvent to the solvent is about 3~16.

5. The treatment system according to claim 1, wherein the solvent is selected from the group consisting of C4-C10 esters, C5-C8 alcohols and a combination thereof, and the cosolvent is selected from the group consisting of C1-C3 alcohols, acetone and a combination thereof.

6. The treatment system according to claim 5, wherein the treatment system comprises about 10~30 vol% of water and the volume ratio of the cosolvent to the solvent is about 0.5~4.

7. The treatment system according to claim 5, wherein one of C4-C10 esters is selected from the group consisting of amyl formate, ethyl acetate, propyl acetate, butyl acetate, pentyl acetate, hexyl acetate, heptyl acetate, octyl acetate, ethyl propanoate, propyl propionate, butyl propanoate, pentyl propanoate, hexyl propanoate, ethyl butanoate, propyl butanoate, butyl butanoate, pentyl butanoate, hexyl butanoate, ethyl pentanoate, propyl pentanoate, butyl pentanoate, pentyl pentanoate, ethyl hexanoate, propyl hexanoate, butyl hexanoate, ethyl heptanoate, propyl heptanoate, ethyl octanoate, and a combination thereof.

8. The treatment system according to claim 5, wherein one of C5-C8 alcohols of the solvent is selected from the group consisting of pentanol, hexanol, heptanol, octanol, benzyl alcohol (/phenylmethanol), phenethyl alcohol (/phenylethanol) and a combination thereof.

9. The treatment system according to claim 5, wherein one of C1-C3 alcohols of the cosolvent is selected from the group consisting of methanol, ethanol, isopropanol and a combination thereof.

10. A method for degrading chlorinated dense non-aqueous phase liquids (DNAPLs), comprises:
providing a treatment system, wherein the treatment system comprises a solvent system and hydrophobic zero valent irons, the solvent system at least comprises a solvent, a cosolvent and about 10~30 vol% of water, the solvent is selected from the group consisting of C4-C10 esters, C12-C15 aromatic hydrocarbon esters, C5-C8 alcohols, and a combination thereof, a volume ratio of the cosolvent to the solvent is about 0.5~16, and the hydrophobic zero valent irons are distributed in the solvent system in a concentration of about 0.01 g/mL~0.2 g/mL; and adding the treatment system into at least one polluted hot spot so as to degrade chlorinated DNAPLs.

11. The method for degrading DNAPLs according to claim 10, wherein the cosolvent is selected from the group consisting of alcohols, acetone, and a combination thereof.

12. The method for degrading DNAPLs according to claim 10, wherein the solvent is selected from C12-C15 benzoic esters and mixtures thereof, and the cosolvent is acetone.

13. The method for degrading DNAPLs according to claim 12, wherein the treatment system comprises about 10~15 vol% of water and the volume ratio of the cosolvent to the solvent is about 3~16.

14. The method for degrading DNAPLs according to claim 10, wherein the solvent is selected from the group consisting of C4-C10 esters, C5-C8 alcohols and a combination thereof, and the cosolvent is selected from the group consisting of C1-C3 alcohols, acetone and a combination thereof.

15. The method for degrading DNAPLs according to claim 14, wherein the treatment system comprises about 10~30 vol% of water and the volume ratio of the cosolvent to the solvent is about 0.5~4.

16. The method for degrading DNAPLs according to claim 14, wherein one of C4-C10 esters is selected from the group consisting of amyl formate, ethyl acetate, propyl acetate, butyl acetate, pentyl acetate, hexyl acetate, heptyl acetate, octyl acetate, ethyl propanoate, propyl propionate, butyl propanoate, pentyl propanoate, hexyl propanoate, ethyl butanoate, propyl butanoate, butyl butanoate, pentyl butanoate, hexyl butanoate, ethyl pentanoate, propyl pentanoate, butyl pentanoate, pentyl pentanoate, ethyl hexanoate, propyl hexanoate, butyl hexanoate, ethyl heptanoate, propyl heptanoate, ethyl octanoate, and a combination thereof.

17. The method for degrading DNAPLs according to claim 14, wherein one of C5-C8 alcohols of the solvent is selected from the group consisting of pentanol, hexanol, heptanol, octanol, benzyl alcohol (/phenylmethanol), phenethyl alcohol (/phenylethanol) and a combination thereof.

18. The method for degrading DNAPLs according to claim 14, wherein one of C1-C3 alcohols of the cosolvent is selected from the group consisting of methanol, ethanol, isopropanol and a combination thereof.

* * * * *